United States Patent [19]

Vogel

[11] 4,079,899
[45] Mar. 21, 1978

[54] WEB TRANSPORT APPARATUS WITH INTERMITTENTLY APPLIED LOADING BRAKE

[75] Inventor: Charles A. Vogel, San Jose, Calif.

[73] Assignee: American Videonetics Corporation, Sunnyvale, Calif.

[21] Appl. No.: 679,513

[22] Filed: Apr. 22, 1976

[51] Int. Cl.² .................. G03B 1/04; G11B 15/32
[52] U.S. Cl. ................................. 242/192; 242/204
[58] Field of Search .......... 242/192, 201–204, 242/75.43, 75.44, 75.51, 186–191; 226/145, 165; 360/71, 73, 74; 200/61.15, 61.17

[56] References Cited

U.S. PATENT DOCUMENTS

| 2,168,023 | 8/1939 | Dymeck | 242/75.44 |
| 3,706,425 | 12/1972 | DeGuchi et al | 242/195 |
| 3,784,073 | 1/1974 | Faggetter | 226/145 |
| 3,968,942 | 7/1976 | Wrobel et al. | 242/204 |

Primary Examiner—Leonard D. Christian
Attorney, Agent, or Firm—Flehr, Hohbach, Test, Albritton & Herbert

[57] ABSTRACT

Transport apparatus having a brake for retarding rotation of a supply roll during the feeding of tape or film from the supply roll to a take-up hub. The brake is applied intermittently, and both electrical and mechanical means are disclosed for actuating the brake.

9 Claims, 2 Drawing Figures

U.S. Patent  March 21, 1978  4,079,899
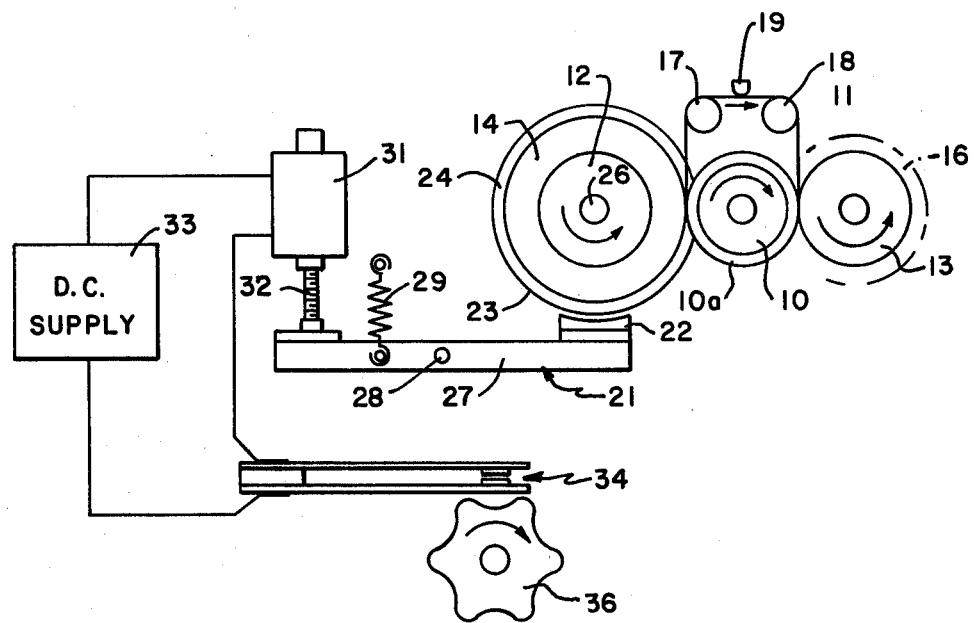
FIG.—1
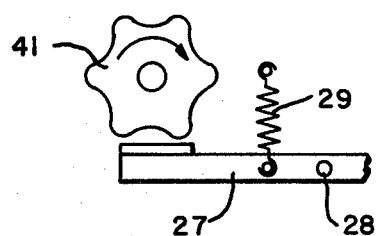
FIG.—2

WEB TRANSPORT APPARATUS WITH INTERMITTENTLY APPLIED LOADING BRAKE

BACKGROUND OF THE INVENTION

This invention pertains generally to transport apparatus and more particularly to transport apparatus of the type in which an elongated strip of pliant material, such as magnetic recording tape or film, is wrapped to form supply and take-up rolls and a drive capstan peripherally engages the rolls to rotate the same and feed the strip from the supply roll to the take-up roll.

In such apparatus, the tape must be maintained in a tensioned condition between the supply and take-up rolls in order to maintain proper control of the tape. After the tape has been loaded onto the transport and first threaded from the supply roll to the take-up hub, it is usually slack or untensioned in the span between rolls, and for proper tape control, it is imperative that tensioning commence as soon as the tip of the tape or leader is captured between the capstan and the take-up hub.

Heretofore, there have been attempts to tension the tape during the threading operation by applying a drag brake to the supply roll. Such attempts have not been satisfactory, however, because the brake must be applied with sufficient force to produce a controlled slippage between the supply roll and capstan. At the same time, the brake must not be applied with so much force that the supply roll stops completely or turns erratically or the threading process may be undesirably prolonged or actually never completed. In practice, it is difficult to maintain the proper braking force.

In order to eliminate the need for critical braking force control, there have been attempts to delay the application of the brake until the tip of the tape or leader is actually captured between the supply roll and the capstan. This approach requires precise timing and therefore means such as a relatively expensive sensor or timer for detecting the capture of the tip.

SUMMARY AND OBJECTS OF THE INVENTION

In the transport apparatus of the invention, a brake is applied intermittently to the supply roll during the threading of tape or film to and onto the take-up hub. The brake can be controlled either electrically or mechanically, and the intermittent application of the brake eliminates the need for critical timing or critical control of the braking force.

It is in general an object of the invention to provide transport apparatus having an improved loading brake for tensioning the tape in the span between rolls during the threading operation.

Another object of the invention is to provide transport apparatus of the above character in which the brake is applied intermittently.

Additional objects and features of the invention will be apparent from the following description in which the preferred embodiments are set forth in conjunction with the accompanying drawings.

BRIEF DESCRIPTION OF THE DRAWINGS

FIG. 1 is a largely schematic top plan view of one embodiment of transport apparatus incorporating the invention.

FIG. 2 illustrates an alternate means for actuating the loading brake in the embodiment of FIG. 1.

DESCRIPTION OF THE PREFERRED EMBODIMENTS

As illustrated in FIG. 1, the transport apparatus comprises a rotatively mounted drive capstan 10 which is driven by suitable means such as a drive motor (not shown). Toward its outer periphery, the capstan is provided with a resilient annular tire 10a.

An elongated strip of magnetic recording tape 11 is wrapped about hubs 12 and 13 to form a supply roll 14 and a take-up roll 16. These rolls are engaged in edge-driven relationship by capstan 10 which serves to rotate the rolls and feed the tape from the supply roll to the take-up roll. The hubs are mounted on independently movable carriages or other suitable means (not shown) which permit the hubs to advance and retreat relative to the capstan as tape is transferred from one roll to the other. The rolls are maintained in contact with the capstan by a spring or other suitable means (not shown) which serves to yieldably urge the rolls toward the capstan. As illustrated in FIG. 1, before the tape is wrapped about take-up hub 13, this hub engages the capstan and is driven thereby.

Between the supply and take-up rolls, the tape is trained to form a loop around guides 17, 18. A transducer head 19 engages the tape between the guides for recording and playback of singals on the tape.

Means is provided for retarding the rotation of supply roll 14 during the threading of tape from the supply roll to take-up hub 13. This means includes a brake 21 which has a pad 22 for frictionally engaging a surface 23 which is constrained for rotation with the supply roll. In the embodiment illustrated, surface 23 is formed at the periphery of a brake drum 24 which is affixed to a shaft 26 upon which the supply roll is mounted. The brake drum is located below the supply roll and can be positioned beneath the deck (not shown) of the apparatus. Alternatively, the brake pad can engage the surface of another member which rotates with the supply roll, including one of the flanges of the supply reel.

Brake pad 22 is mounted on a brake arm 27 which is pivotally mounted on a pivot pin 28. A return spring 29 urges the brake arm toward a retracted position with pad 22 disengaged from surface 23.

Means is provided for intermittently actuating the brake to retard the rotation of the supply roll during the threading of the tape. In the embodiment of FIG. 1, this means includes an electrically energized solenoid 31 which is operatively connected to brake arm 27 by a pushrod 32. The solenoid is energized from a direct current supply 33 through contacts 34. Opening and closing of the contacts is controlled by a cam wheel 36 driven by suitable means such as a drive motor (not shown). Alternatively, the pulsating current applied to solenoid 31 can be produced electronically or by other suitable means.

Operation and use of the transport apparatus of FIG. 1 can be described briefly. Initially, supply roll 14 is placed on shaft 26, and capstan 10a is rotated to thread the leader portion of the tape around guides 17, 18 toward take-up hub 13. During the threading of the tape, cam wheel 36 rotates to operate contacts 34 and thereby intermittently energize solenoid 31. When energized, the solenoid causes brake arm 27 to pivot in the counterclockwise direction, as viewed in FIG. 1 moving brake pad 22 into engagement with surface 23. When the solenoid is deenergized, return spring 29 disengages the brake pad from the brake drum. The intermittent application of the brake tends to retard the rotation of the supply roll, and the tape is thereby tensioned between the supply roll and the take-up hub while passing therebetween. The intermittent application of the brake continues until the threading operation is completed, following which the solenoid is deenergized.

In the embodiment of FIG. 2, a motor driven cam wheel 41 engages brake arm 27 to actuate the brake intermittently during the threading of the tape. In all other respects, the operation and use of this embodiment are identical to those described above.

The invention has a number of important features and advantages. The intermittent application of the brake tensions the tape effectively and eliminates the problems of timing and critical braking force control which were present in the prior art. An excessive braking force cannot prevent completion of the threading process because the brake is intermittently released, permitting the process to continue even though the brake may momentarily prevent all rotation. Timing is not critical because the brake can be activated before the tip of the tape actually reaches the take-up hub, thereby assuring that the tape will be tensioned almost immediately upon being captured between the capstan and take-up hub. Although described with specific reference to a tape transport, the invention can be utilized with film and other pliant materials.

It is apparent from the foregoing that a new and improved apparatus has been provided. While only certain preferred embodiments have been described, as will be apparent to those familiar with the art, certain changes and modifications can be made without departing from the scope of the invention as defined by the following claims.

What is claimed is:

1. In transport apparatus of the type in which an elongated strip of pliant material is wrapped about supply and take-up hubs to form supply and take-up rolls and a drive capstan peripherally engages the rolls to rotate the same and feed the strip from the supply roll to the take-up roll, the improvement comprising: a brake serving to tension the strip by retarding rotation of the supply roll, and means for intermittently and repeatedly actuating the brake to apply a pulsating braking force to the supply roll during initial threading of the strip from the supply roll onto the take-up hub.

2. The transport apparatus of claim 1 wherein the strip of material is a length of magnetic recording tape.

3. The transport apparatus for claim 1 wherein the brake is a frictional drag brake.

4. The transport apparatus for claim 1 wherein the means for actuating the brake includes an electrically energizable solenoid and means for energizing the solenoid at a predetermined rate.

5. The transport apparatus of claim 1 wherein the means for actuating the brake includes a cam wheel.

6. In tape transport apparatus: a supply roll, a take-up hub, a drive capstan engaging the supply roll and take-up hub in edge driving relationship for rotating the same to transfer tape from the supply roll to the take-up hub, and brake means for applying a pulsating braking force to the supply roll to retard rotation of said roll throughout the initial threading of the tape from the supply roll onto the take-up hub.

7. The transport apparatus of claim 6 wherein the brake means includes a brake drum constrained for rotation with the supply roll and means for frictionally engaging the brake drum.

8. The transport apparatus of claim 6 further including electrically actuated means for intermittently and repeatedly actuating the brake means.

9. The transport apparatus of claim 6 further including mechanical actuator means for intermittently and repeatedly actuating the brake means.

* * * * *